US007465080B2

(12) United States Patent
Van Gennip et al.

(10) Patent No.: US 7,465,080 B2
(45) **Date of Patent: *Dec. 16, 2008**

(54) OPTICAL WAVEGUIDE SYSTEM HAVING A DISCHARGE LAMP WITH A REFLECTOR AND AN ASSYMETRICAL BURNER

(75) Inventors: Nicasius G. T. Van Gennip, Heeze (NL); Michael Haacke, Aachen (DE); Thomas Luce, Esslingen (DE); Petrus J. M. Fransen, Nederweert (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 103 days.

This patent is subject to a terminal disclaimer.

(21) Appl. No.: 11/446,314

(22) Filed: Jun. 2, 2006

(65) Prior Publication Data

US 2006/0285346 A1 Dec. 21, 2006

Related U.S. Application Data

(63) Continuation-in-part of application No. 10/500,505, filed on Jun. 29, 2004, now Pat. No. 7,083,306.

(51) Int. Cl.
*F21S 8/10* (2006.01)
*F21V 7/09* (2006.01)
*B60Q 1/04* (2006.01)

(52) U.S. Cl. ....................... 362/511; 362/263; 362/296; 362/507; 362/538

(58) Field of Classification Search ................. 362/511, 362/217, 221, 263, 265, 296, 341, 551, 554, 362/560, 507, 538; 313/113
See application file for complete search history.

(56) References Cited

U.S. PATENT DOCUMENTS

| | | | | |
|---|---|---|---|---|
| 3,684,908 | A * | 8/1972 | Beese | 313/24 |
| 4,766,526 | A * | 8/1988 | Morimoto et al. | 362/255 |
| 5,138,219 | A * | 8/1992 | Krisl et al. | 313/112 |
| 5,466,981 | A * | 11/1995 | Fields et al. | 313/113 |
| 6,049,169 | A * | 4/2000 | Gibson et al. | 313/635 |
| 6,246,170 | B1 * | 6/2001 | Sugawara | 313/570 |
| 6,481,881 | B2 * | 11/2002 | Tiesler-Wittig | 362/554 |
| 6,710,521 | B2 * | 3/2004 | Tsuda et al. | 313/113 |
| 6,784,601 | B2 * | 8/2004 | Kai et al. | 313/46 |

FOREIGN PATENT DOCUMENTS

| | | | |
|---|---|---|---|
| EP | 1055868 | A | 11/2000 |
| WO | 9839675 | A | 9/1998 |
| WO | 9932825 | A | 7/1999 |
| WO | 0239012 | | 5/2002 |

* cited by examiner

*Primary Examiner*—Jong-Suk (James) Lee
*Assistant Examiner*—Leah S Lovell

(57) ABSTRACT

An optical waveguide system has a discharge lamp with a reflector and an asymmetrical burner. The reflector has a reflecting surface and a hollow reflector neck. The asymmetrical burner is partly arranged in the hollow reflector neck, without making contact with it. The shape and the size of the inner contour of the reflecting surface of the reflector corresponds substantially to the contour of the asymmetrical burner, and the asymmetrical burner is centrally located in the reflector.

9 Claims, 3 Drawing Sheets

OPTICAL WAVEGUIDE SYSTEM HAVING A DISCHARGE LAMP WITH A REFLECTOR AND AN ASSYMETRICAL BURNER

This is a continuation-in-part of application Ser. No. 10/500,505, filed Jun. 29, 2004 now U.S. Pat. No. 7,083,306.

The invention relates to a discharge lamp with a reflector and an asymmetrical burner, which reflector comprises at least a reflecting surface and a hollow reflector neck, while the burner is partly arranged in said hollow reflector neck without making contact therewith.

The light quality is dependent on various parameters, for example the efficiency of the reflector, in the case of a discharge lamp comprising at least a burner and a reflector. The efficiency of the reflector is influenced not only by the nature and quality of its reflecting surface, but also by the reflector geometry. The reflector geometry attuned to the respective application, i.e. in particular its shape and size, is inextricably interlinked with the nature of the light source and the geometry thereof.

A light source in the sense of the invention may be, for example, a known burner of a discharge lamp with a return pole. Such a burner with a return pole, which may be used, for example, in headlights of motor vehicles, has an asymmetrical shape on account of its construction. If such conventional discharge lamps are used, for example, for applications in which light is emitted with as low a loss as possible and is focused on a point or on a defined region, the efficiency of the reflector is dependent inter alia on the size of the reflecting surface area. The inner contours of the reflecting surfaces of the relevant known reflectors, which have a hollow reflector neck, all have a circular shape. The use of such a shape of the inner contour and of an asymmetrical burner renders it impossible to avoid an impairment of the light quality, here in particular of the light output. If the efficiency of the reflector has a particular significance, for example in applications where the light reflected by the reflector is coupled into an optical waveguide, a significant impairment of the light quality can be observed, caused by regularly occurring coupling losses. Losses again occur in the emission of the light from the optical waveguide each time, independently of the former losses, so that the efficiency of the reflector in such an optical waveguide system is one of the substantial determining factors for the total efficiency of the system. The use of such an optical waveguide system as a lighting system for motor vehicles, where standardized values must be achieved on a regular basis with respect to the light quality, necessitates a very exact and expensive attunement of the optical system components. Optical waveguide systems for motor vehicles which have at least one light source, comprising at least one discharge lamp with a reflector and an asymmetrical burner, are in the focus of development. These optical waveguide systems comprise inter alia a system of optical waveguide cables and optical elements which realize and support the coupling of the light into and from the optical waveguide, thus making the light available for the desired application, for example through a headlight of a motor vehicle, in a known manner.

It is an object of the invention to provide a discharge lamp which can be manufactured in a technologically simple and inexpensive manner, while a required light quality is safeguarded by a good efficiency of the reflector.

The object is achieved in that the shape and the size of the inner contour of the reflecting surface of the reflector corresponds substantially to the contour of the burner, and in that the burner is centrally located in the reflector.

The invention renders it possible to realize an optimized adaptation of the shape and size of the inner contour of the reflecting surface of the reflector to the contour of the burner, in particular taking into account the tolerances necessary for mounting and adjustment of the asymmetrical burner and the reflector, the inner contour of the reflecting surface of the reflector, which merges directly into the reflector neck, being greater than the outer contour of the burner. This adaptation according to the invention offers the largest possible reflecting surface area of the reflector, an adaptation whose significance for the total efficiency of the reflector lamp, in particular in special applications, was ascertained by a plurality of laboratory experiments and which those skilled in the art have never before conceived or realized. Surprisingly simple means according to the invention thus provide a reflector lamp which can be used as an effective light source for optical waveguide systems. The central arrangement of the burner in the reflector in particular safeguards a simple and accurate adjustment of the focus.

Discharge lamps in the sense of the invention are all known lamp types with an asymmetrically shaped burner and a reflector. The asymmetrically shaped burners are in particular burners of discharge lamps known per se with return poles.

The reflector according to the invention then comprises usual materials such as glass, ceramic material, metal, and/or synthetic resin.

The expression "contour of the burner" is to be understood as being the outermost contour of the burner within the scope of the invention, i.e. the contour visible in the plan view (x-y plane) of the discharge lamp comprising an asymmetrical burner in the incorporated state, for example as shown in FIG. 1.

In a preferred embodiment of the solution according to the invention, the inner contour of the reflecting surface of the reflector is symmetrical with respect to the x-axis and asymmetrical with respect to the y-axis, while the asymmetrical portion of the burner extends in the direction of the x-axis after being assembled. Such a shaping of the inner contour of the reflecting surface of the reflector as proposed here renders it possible to use simple geometric shapes, such as semicircular arcs and straight lines, while fulfilling the criteria mentioned above, resulting in a satisfactory adaptation of the respective inner contour to the outer contour of the burner in many applications, while observing the necessary tolerances.

A further preferred embodiment of the invention in this respect is characterized in that the inner contour of the reflecting surface of the reflector has the shape of an ellipse or of a rectangle with rounded corners.

An alternative embodiment of the invention is characterized in that the inner contour of the reflecting surface of the reflector is adapted to the contour of the burner such that the surface area of the reflecting surface reaches a maximum. Such a maximum is reached when very high requirements are imposed on the mutual agreement of the contours, while observing the necessary tolerances. This embodiment is technologically more complicated and accordingly requires a correspondingly higher expenditure in industrial mass manufacture.

The object of the invention is furthermore achieved in that a discharge lamp as claimed in the claims 1 to 4 is used as a light source in an optical waveguide system which serves as a lighting system for a motor vehicle and which has at least one light source comprising a discharge lamp with a reflector and an asymmetrical burner.

Optical waveguide systems within the scope of the invention comprise besides a light source at least a system of optical waveguide cables and optical elements which couple the light into and from the optical waveguide and which realize and support the provision of the light to the envisaged application, for example for lighting purposes, in a known manner.

The invention will be explained in more detail below with reference to an embodiment. In the Figure:

FIG. 1 diagrammatically shows a burner with a return pole of a discharge lamp, FIG. 2 shows a discharge lamp with a return pole in plan view, and FIG. 3 shows the reflector of the discharge lamp in lateral sectional view.

Figure 1:
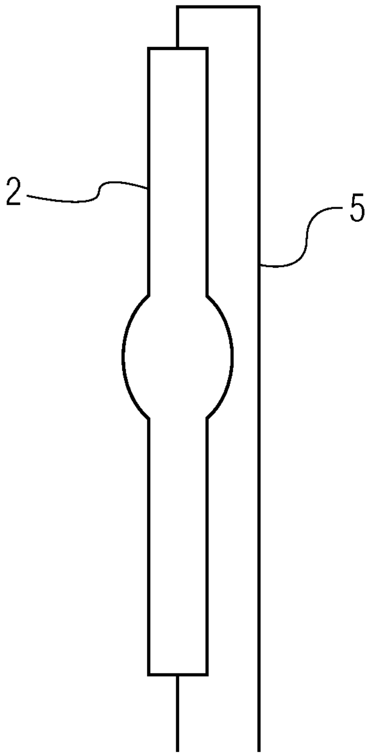

FIG. 1 diagrammatically shows a burner 2 with return pole 5 of a discharge lamp, which burner 2 is connected to the return pole 5 with electrical conduction in a known manner.

Figure 2:
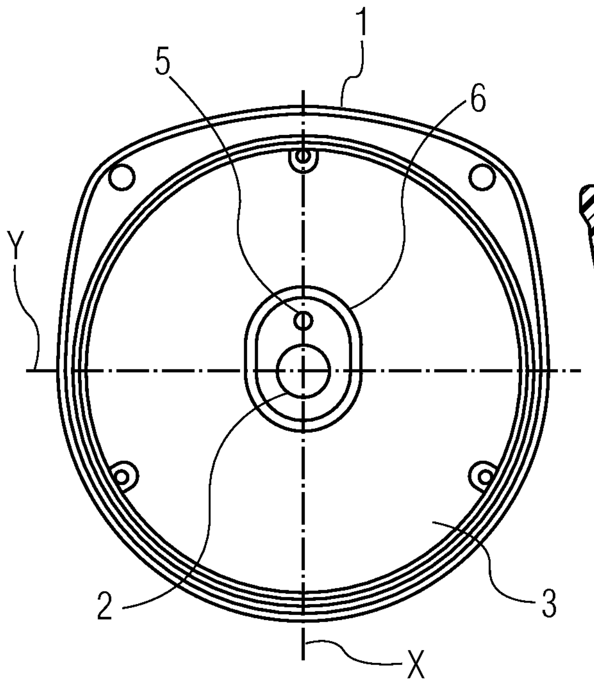

FIG. 2 is a plan view of a discharge lamp with a return pole 5 (for example a xenon lamp) for an optical waveguide system for the headlight of a motor vehicle. The reflector 1 is made of a borosilicate glass here and has a reflecting surface 3 and a hollow reflector neck 4. The burner 2 is centrally located in the reflector 1 by means of a retention device (not shown in FIG. 1) at least partly in the hollow reflector neck 4, without contact between the inner surface of the reflector neck 4 and the outer surface of the burner 2. A retention device fixes the burner 2 in a defined position which safeguards an optimum luminous intensity and focusing of the reflected light on the focus lying outside the reflector 1. In this focus, the reflected light is fed into an optical waveguide cable which is known per se, for example a glass fiber cable, of an optical waveguide system in a usual manner. The inner contour 6 of the reflecting surface 3 of the reflector 1 is symmetrical with respect to the x-axis in the x-y plane, and asymmetrical with respect to the y-axis. The inner contour 6 of the reflecting surface 3 of the reflector 1 is formed by simple geometric shapes, i.e. by two semi-circular arcs of equal size which are interconnected by two parallel straight lines. Given a radius of the semi-circular arcs of approximately five millimeters each, the distance of the inner contour 6 from the point of intersection of the x- and y-axes on the x-axis is approximately five millimeters and seven millimeters, respectively.

Figure 3:
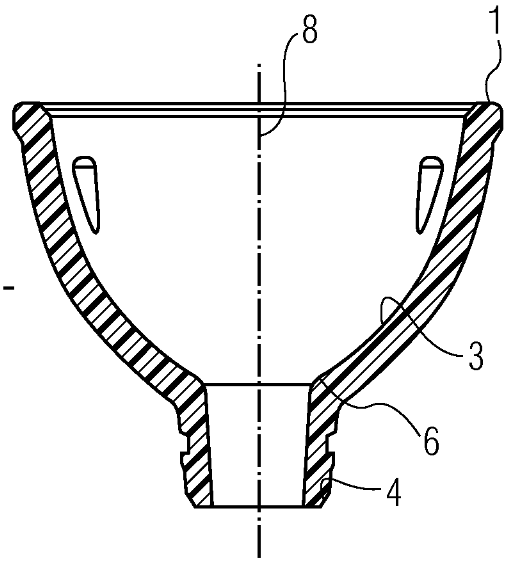

FIG. 3 shows the reflector of FIG. 2 in a cross-sectional lateral view. A reflector axis 8 extends through the center of the burner 2 in a direction orthogonal to the x-y plane shown in the plan view of FIG. 2.

Figure 4:
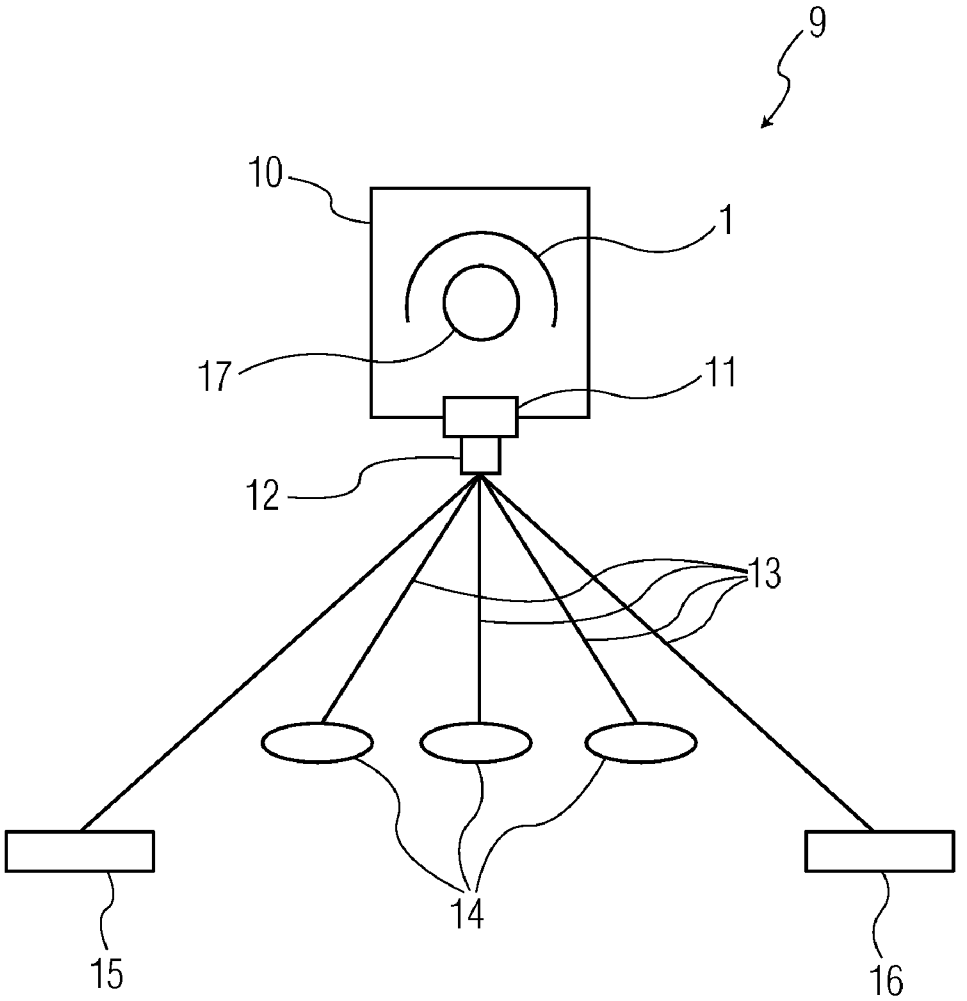
FIG. 4 shows an optical waveguide system with a discharge lamp.

FIG. 4 shows an optical waveguide system 9 with a gas discharge lamp 17 as the central light source, arranged in a light coupling system 10. The known optical waveguide system 9 is described briefly only. It comprises a housing with a reflector 1 or a similar optical unit in which the lamp 17 is exchangeably arranged. The reflector 1 focuses the light generated by the lamp 17 onto an input opening 11. The light coupling system 10 may also be provided with a fan or some other device suitable for heat regulation. In this embodiment, furthermore, a light mixer 12 is provided in front of the inlet opening 11, consisting of a 30-60 mm long quartz glass rod. The light mixer 12 achieves a homogeneous light distribution at its end, so that the proportional output light quantity of any optical waveguide 13 connected to the light mixer is given by the diameter and the length of the relevant optical waveguide 13. If no light mixer 12 is provided, for saving space and to avoid any light losses, the light generated by the input coupling system 10 is distributed over the individual optical waveguides 13 in the manner in which it issues at the coupling opening 11.

Several optical waveguides 13 are connected to the light mixer 12, which optical waveguides are connected to light delivery systems 14, 15, 16. Besides two headlamps 15 and 16, several further lighting devices 14 of the automobile, for example interior lights, rear lights, and other signaling lights, may be connected. The number and nature of the lighting devices depend on the generated quantity of light of the coupling system 10 used, i.e. on the lamp 17, the efficiency of the reflector 1, and the diameter of the coupling opening 11, and on the efficiency of the optical waveguides 13, i.e. in particular on the material quality, the diameter, and the length thereof. The lighting system may be optimized through an improvement in the reflector properties and by means of a large coupling opening 11. In addition, the installation of more than one such system in a motor vehicle is conceivable. The properties of the light at a lighting device 14 may be adapted to the respective lighting device by means of suitable optical waveguides (reduction of luminous intensity through attenuation or absorption) or color discs (adjustment of a given color). The optical waveguide 13 may be a fiber optic bundle or any other light conductor used to convey energy along its length, as is known to those of skill in the art.

Figure 5:
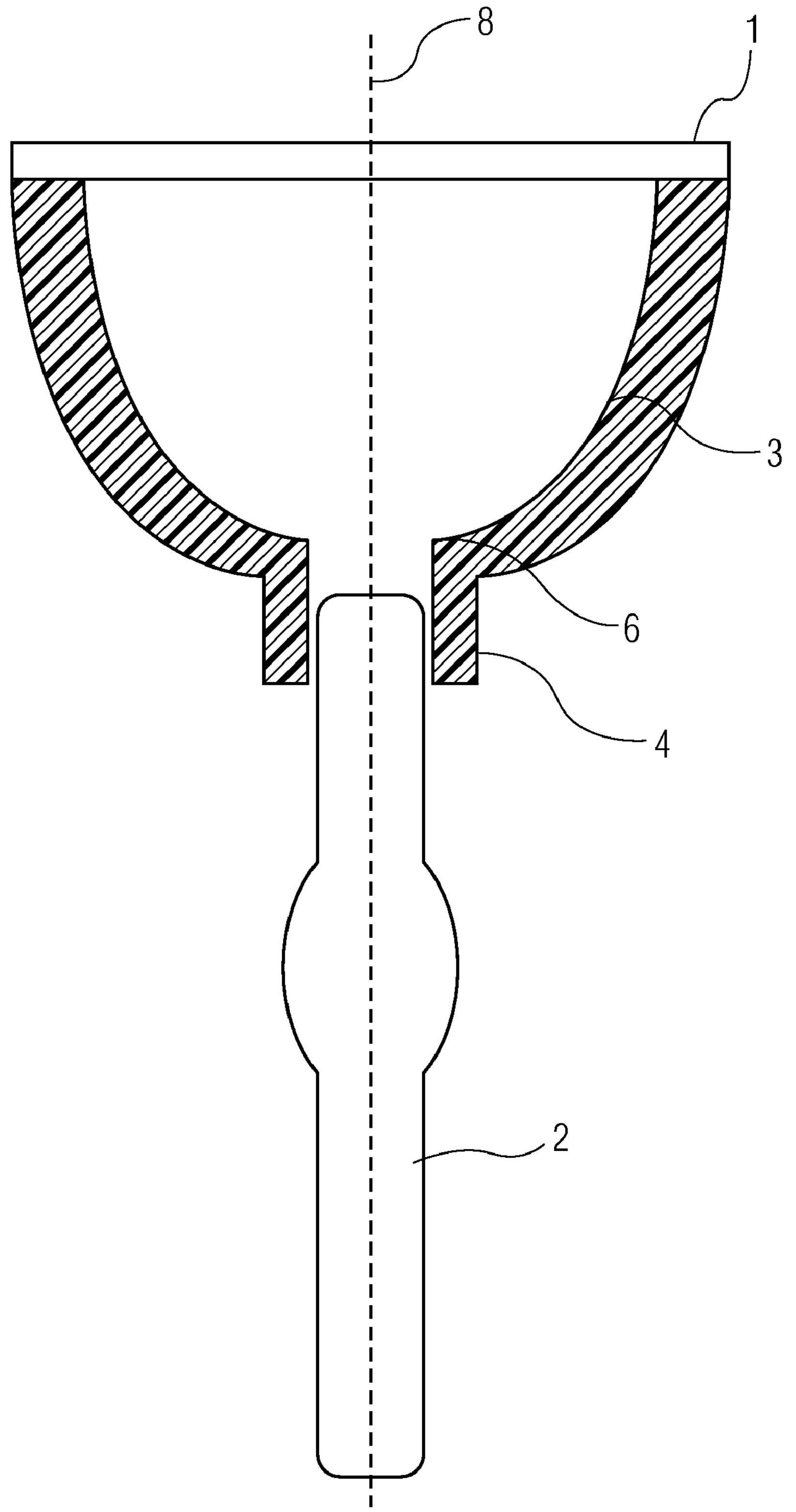
FIG. 5 shows a burner partially arranged in the neck of the discharge lamp.

FIG. 5 shows the burner 2 centrally located in the reflector 1 of a discharge lamp by means of a retention device (not shown in FIG. 1) at least partially arranged in the hollow reflector neck 4, without contact between the inner surface of the reflector neck 4 and the outer surface of the burner 2. A reflector axis 8 extends through the center of the burner 2 in a direction orthogonal plane shown in the plan view of FIG. 2.

Finally, the above-discussion is intended to be merely illustrative of the present invention and should not be construed as limiting the appended claims to any particular embodiment or group of embodiments. Each of the systems utilized may also be utilized in conjunction with further systems. Thus, while the present invention has been described in particular detail with reference to specific exemplary embodiments thereof, it should also be appreciated that numerous modifications and changes may be made thereto without departing from the broader and intended spirit and scope of the invention as set forth in the claims that follow. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference numerals in the claims are for illustration purposes only and do not limit their protective scope;

d) several "means" may be represented by the same item or hardware or software implemented structure or function; and e) each of the disclosed elements may be comprised of hardware portions (e.g., discrete electronic circuitry), software portions (e.g., computer programming), or any combination thereof.

The invention claimed is:

1. An optical waveguide system comprising at least one discharge lamp optically coupled to a waveguide, the discharge lamp having a reflector and an asymmetrical burner, the reflector comprising at least a reflecting surface and a hollow reflector neck, the asymmetrical burner being partly arranged in the hollow reflector neck without making contact therewith, the shape and the size of an inner contour of the reflecting surface of the reflector corresponding substantially to a contour of the asymmetrical burner, the asymmetrical burner being centrally located in the reflector, wherein the reflecting surface of the reflector has a substantially oval asymmetrical shape corresponding substantially to the contour of the asymmetrical burner and a return pole, the shape and size of the inner contour of the reflecting surface being symmetrical in an x-direction and asymmetrical in a y-direction in a cross-sectional view of the hollow reflector neck and orthogonal to the reflector axis, and the asymmetry in the y-direction preventing rotation of the asymmetrical burner in the hollow reflector neck and increasing a reflective surface area of the hollow reflector neck thereby increasing the light output efficiency.

2. The optical waveguide system of claim 1, wherein the waveguide is a bundle of optical fibers.

3. The optical waveguide system of claim 1, wherein the inner contour of the reflecting surface is symmetrical with respect to the x-axis and asymmetrical with respect to the y-axis.

4. The optical waveguide system of claim 1, wherein the inner contour of the reflecting surface has the shape of an ellipse.

5. The optical waveguide system of claim 1, wherein the inner contour of the reflecting surface has the shape of a rectangle with rounded corners.

6. The optical waveguide system of claim 1, wherein the inner contour of the reflecting surface has the shape is formed by semicircular arcs and straight lines.

7. The optical waveguide system of claim 1, wherein the asymmetrical burner is a burner with a return pole.

8. The optical waveguide system of claim 1, wherein the asymmetrical burner is a burner with a return pole.

9. The optical waveguide system of claim 1, wherein the inner contour of the reflecting surface is adapted to the contour of the asymmetrical burner such that the surface area of the reflecting surface reaches a maximum.

* * * * *